March 21, 1944.　　　F. G. CLARK　　　2,344,535
AUTOMATIC CONTROL MECHANISM
Filed Aug. 1, 1942　　　2 Sheets-Sheet 1
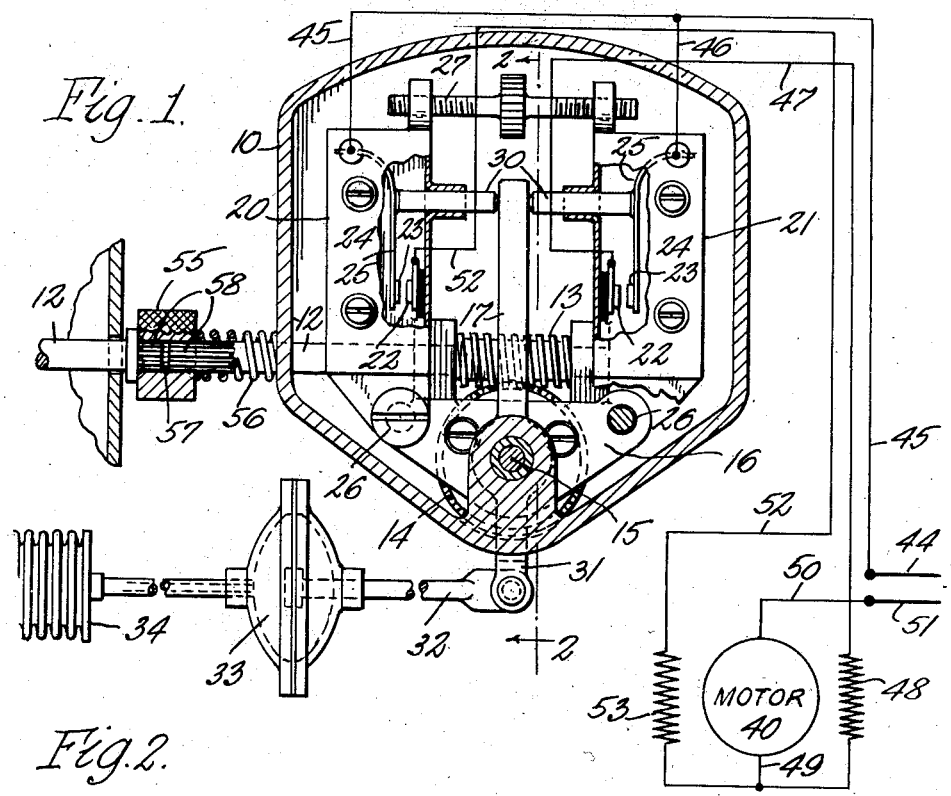
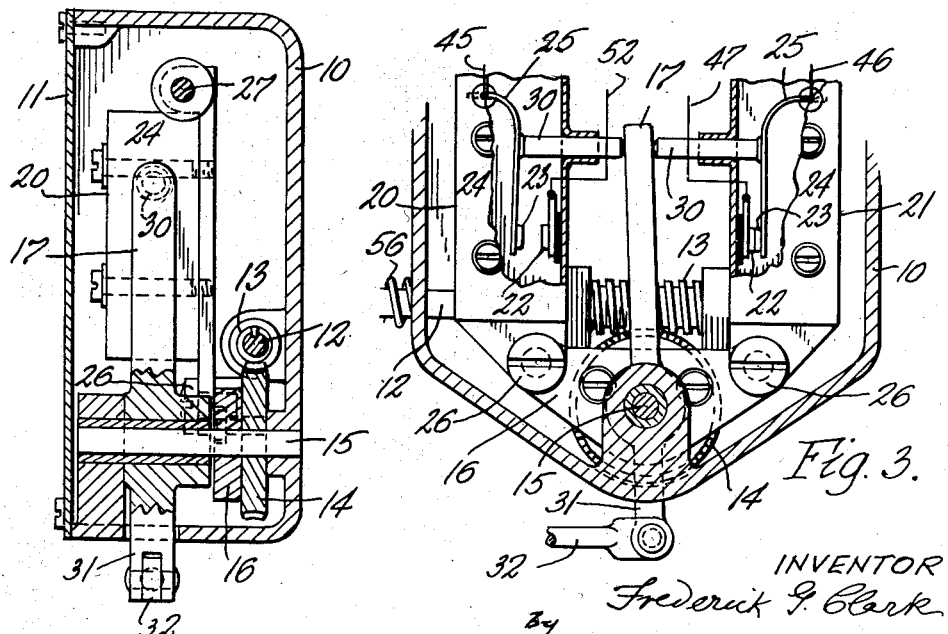
INVENTOR
Frederick G. Clark
By Parker, Prochnow & Farmer
ATTORNEYS March 21, 1944.  F. G. CLARK  2,344,535
AUTOMATIC CONTROL MECHANISM
Filed Aug. 1, 1942  2 Sheets-Sheet 2
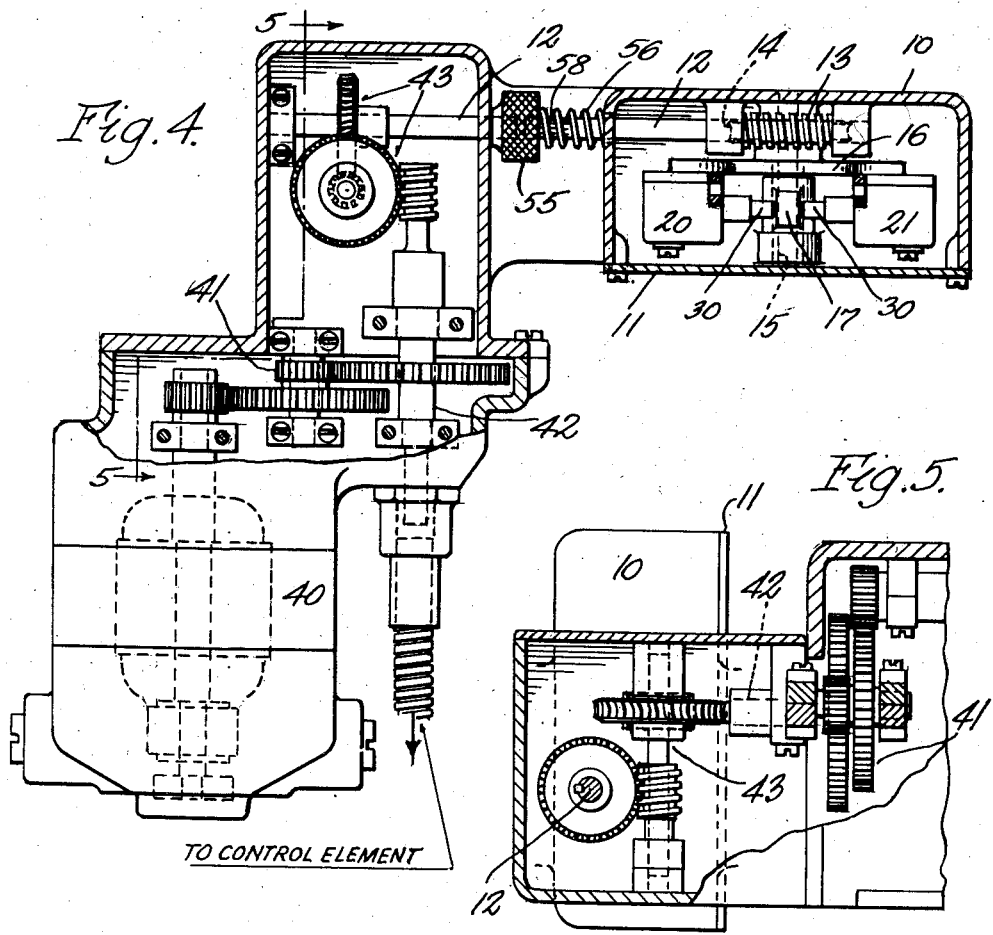
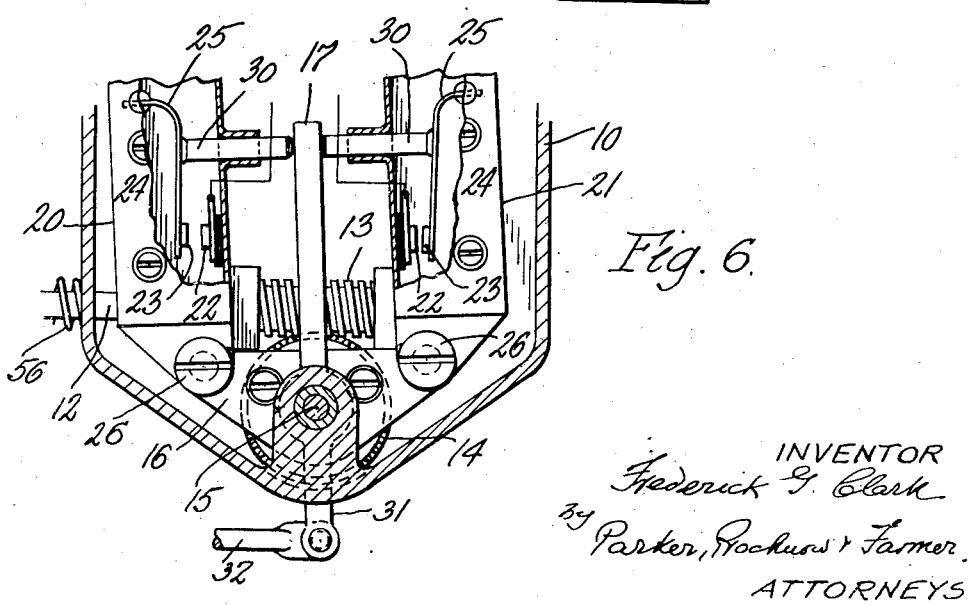
INVENTOR
Frederick G. Clark
By Parker, Rockwell & Farmer
ATTORNEYS Patented Mar. 21, 1944

2,344,535

UNITED STATES PATENT OFFICE 2,344,535

AUTOMATIC CONTROL MECHANISM

Frederick G. Clark, Buffalo, N. Y., assignor to Eastman Machine Company, Buffalo, N. Y.

Application August 1, 1942, Serial No. 453,183

18 Claims. (Cl. 236—74)

This invention relates to a switch mechanism or means for automatically controlling the operation of a control device or element that may be employed, for instance, to correct or regulate temperature variations in a unit to be controlled. The switch mechanism is desirable, for example, for use in controlling the operation of the electric motor which variably actuates or adjusts the control damper or element for the cooling system of the engine of an airplane or other vehicle. The invention, however, is not restricted to the purpose for which the element may be employed, since it may be used in various different applications.

One object of the invention is to provide a practical and desirable switch mechanism for such purpose which will be efficient and reliable in operation; and which furthermore can be readily set to operate within different required ranges of action and with greater or less sensitivity in any range for which it may be set.

Other objects are to provide a control operating switch which is of improved novel construction; which is adapted to actuate a temperature correcting or control element in accordance with fluctuations in temperature so as to maintain a desired operation of the unit to be controlled; which is provided with means whereby the switch mechanism can be readily adjusted to control with greater or less sensitivity or, i. e., in response to greater or less temperature fluctuations; which is provided with means whereby the mechanism can be quickly and easily set to control temperature variations within one or another required temperature range; and the control operation of which will not be affected by vibrations of the airplane or other apparatus with which the mechanism is used.

Further objects and advantages of the invention will appear from the following specification of a preferred embodiment of the invention, shown in the accompanying drawings, and the novel features of the invention are set forth in the appended claims.

In said drawings:

Fig. 1 is a front elevation of a control operating switch mechanism embodying the invention, and showing the enclosing casing for the same in section, and illustrating diagrammatically the electric circuits for the motor that operates the control element.

Fig. 2 is a transverse, sectional elevation thereof on line 2—2, Fig. 1.

Fig. 3 is a fragmentary view similar to Fig. 1, but showing the switch actuating member moved to close one switch.

Fig. 4 is a plan view, partly in section, showing the association of the switch mechanism with a motor that operates the control element.

Fig. 5 is a sectional elevation on line 5—5, Fig. 4.

Fig. 6 is a fragmentary view similar to Fig. 1, but showing the position of the parts when the switches have been shifted to reopen the switch that has been closed by the switch actuating member.

The switch mechanism, in the embodiment of the invention illustrated in the drawings, is constructed as follows:

10 represents a stationary support, preferably in the form of a casing of suitable shape adapted to enclose and protect the operating parts of the switch mechanism, and which may be closed by a removable cover 11. A shaft 12 is rotatably mounted in the casing 10 in suitable bearings, with one end of the shaft extending out of the casing for driving connection with the motor that operates the control element, as hereinafter described. Said shaft is geared, as by a worm 13 thereon, and a worm wheel 14 on a shaft 15 suitably mounted in the casing 10, to a switch carrier or plate 16, which is thus adapted to be turned or rotatably adjusted about the axis of shaft 15 as a center, by rotation of the motor driven shaft 12. The carrier 16 may be fixed to the worm wheel 14 to turn therewith in any suitable manner. A switch-actuating lever or member 17 is preferably mounted to swing independently of the work wheel and switch carrier, about the shaft 15 as an axis or fulcrum. Two switches 20 and 21 are mounted on the carrier 16 at opposite sides of the lever 17 and are constructed and arranged so that one switch 20 is adapted to be closed and the second switch opened by movement of the lever 17 in one direction from an intermediate normal position, while the second switch is adapted to be closed and the first one opened by an opposite movement of the lever from said intermediate position.

As shown, each switch comprises stationary and movable contact members 22 and 23 suitably mounted in a switch block 24 of appropriate insulating material, the movable contact member, as shown, being secured on a spring arm or strip 25 attached at one end to the block, so that the switch arm 25 can flex to open and close the switch. The switch blocks 24 are movably mounted on the carrier 16 so as to be capable of adjustment toward and from each other and the switch actuating lever 17. Preferably, as shown, each switch block is pivotally mounted at one end, as by a pivot screw 26, on the carrier 16, and the opposite ends of the blocks are connected by an adjusting screw 27 having opposite screw-threaded ends arranged to turn in threaded holes in lugs or parts at the free ends of the two blocks. By turning the adjusting screw 27, as by a knurled wheel at its middle part, in one direction, the switch blocks with their switches can be adjusted and held nearer together or towards the lever 17, while by turning the adjusting screw in the opposite direction, the blocks with their switches can be adjusted and held further apart or away from the lever 17.

The movement of the lever 17 may be transmitted to the movable or spring arms of the switches by rods or pins 30 movable endwise in suitable guide holes in the switch blocks, with the inner ends of the pins abutting against opposite sides of the lever 17, and the outer end of each pin engaging the spring arm 25 of one of the switches 20 and 21. In the normal or central position of the switch-actuating lever, the pins 30 will hold both switch arms 25 under tension with both switches open, or their contacts out of engagement, the two pins 30 thus being held by the spring arms in contact with the opposite sides of the lever.

The switch-actuating lever or member 17 is operatively connected, as by an arm 31 of the lever and an attached connecting rod 32 to a power transmitting device 33, which may be of the diaphragm type shown, and may be operated under temperature control through the medium of a thermoresponsive element 34 so that a rise in temperature affecting the element 34, will cause the lever 17 to swing in one direction, whereas a drop in temperature affecting the element 34, will cause an opposite movement of the lever. As illustrated in Figs. 1 and 3, for example, a rise in temperature will cause movement of the lever to the left, thereby permitting the spring arm 25 of the switch 21 to close this switch and, by pressure of the lever on the pin and spring arm of the other switch 20 to retain the latter switch open. On the other hand, a fall in temperature will cause an opposite movement of the switch lever, whereby, in a similar manner, the switch 20 will be closed and the switch 21 retained open.

Referring now more particularly to Figs. 4 and 5, these figures illustrate an operative application of the above described switch mechanism in combination with a reversible electric motor that operates a control element or device to correct or regulate temperature variations in the unit to be controlled. This motor 40 operates through a suitable speed reduction gearing 41 to drive a shaft 42 which is operatively connected in any suitable way to the temperature control element (not shown) and is adapted to shift the same in one or the other direction by forward or reverse rotation of the motor and the shaft 42. Drive shaft 42, as shown, is geared by a suitable speed reduction gearing (preferably a double worm and worm wheel gearing) 43, to the shaft 12 of the control switch mechanism. This shaft rotates very slowly, for instance, at a speed of 1 R. P. M., and turns the worm wheel 14 and switch carrier 16 of the switch mechanism only a small fraction of one revolution, say, for example, one-forty-eighth of a revolution, during one revolution of shaft 12. Switches 20 and 21 are operatively connected with the motor 20, so that by closing one switch 21, the motor is caused to rotate, say in a clockwise direction, while by closing the other switch 20, reverse rotation of the motor is caused. For this purpose, for instance, as diagrammatically indicated in Fig. 1, switch 21 may close an electric circuit from one side 44 of a supply line through conductors 45, 46, the switch 21, conductor 47, one field winding 48 of the motor and conductors 49 and 50 to the other side 51 of the supply line, while the other switch 20 may close an electric circuit from line wire 44 through conductor 45, the switch 20, conductor 52, the other field winding 53 of the motor, and conductors 49 and 50 to the other line wire 51.

The operation of the embodiment of the invention hereindisclosed may be described as follows:

Assuming that the parts of the switch mechanism are in the normal position shown in Fig. 1, with switches 20 and 21 open and their actuating lever 17 in its central position, the parts will so remain, so long as the temperature to which the thermoresponsive element 34 is subjected does not fluctuate from the predetermined condition which the mechanism is intended to maintain. A rise in the temperature causes the switch-actuating lever 17 to move to the left, as illustrated, and close switch 21, as shown in Fig. 3, and maintain the other switch 20 open. This causes rotation of the motor 40 and the shaft 12 in a direction to swing the switch carrier 16 with both switches in the same direction that the lever moves and, consequently, if the temperature change is not great enough to move the lever 17 as fast as the switches are moving, the switch 21 will catch up with the lever, thereby again opening the switch, since the lever and pin will hold the spring arm 25 of the switch from partaking in the bodily movement of the switch, which will break the motor operating circuit and stop the motor. So long as the motor runs in the direction stated, it will continue to move the control element actuated by the motor-driven shaft 42, more and more in the direction to lower the temperature affecting the unit being controlled until the motor and control element are arrested by the reopening of the switch 21, as just explained. Similarly, a reduction in temperature below that intended to be maintained will, through the medium of the thermoresponsive means, cause the opposite movement of the switch lever 17 from normal position, thus closing the switch 20 while maintaining the other switch 21 open, and thus cause reverse rotation of the motor. The reverse rotation of the motor operates the temperature control element to raise the temperature and turns the switch carrier 16 and the two switches in the same direction that the switch lever 17 now moves, thereby reopening the switch 20 and stopping the reverse operation of the motor and temperature-raising operation of the control element.

It will be noted that the mechanism thus functions to shift or operate the control element a variable distance or amount in either direction or action of the element, depending upon the magnitude of the temperature change, and if the temperature, for example, should continue to rise and move the lever 17 faster than the switches themselves are moved by the motor, the action of the control element will be continued in a direction to lower the temperature until the temperature rise ceases and the relative movement of the lever and switches changes so as to cause the switches to overtake or catch up with the lever sufficiently to open the switch which has been closed.

The shaft 12 which adjusts the switch carrier is preferably made in sections separably connected by a coupling sleeve 55 which is splined on the adjacent ends of the shaft sections to rotate with, but be slidable endwise upon one shaft section into and out of coupling engagement with the other shaft section. Normally the sleeve 55 is held by a spring 56 in the position shown in Fig. 1, to couple the two shaft sections to rotate together. By simply sliding the sleeve along the shaft section which is geared to the switch carrier until the sleeve is disengaged from the other shaft section, and then turning the coupling sleeve, the shaft section of the switching mechanism can be turned so as to adjust the switch carrier and both switches one way or another relatively to the switch-actuating lever 17 when, by releasing the coupling sleeve, it will again couple the shaft sections together in a different angular relation to each other. By such adjustment of the shaft section and switch carrier, the switch mechanism can be set to operate at one or another desired temperature range, while by the adjustment of the switch blocks 24 toward or from each other, by means of the adjusting screw 27 before mentioned, the operation of the switches can be made less or more sensitive for any range of temperature for which the mechanism may be set.

Preferably, the coupling sleeve 55 has a number of internal longitudinal spline teeth 57 arranged in a circular series and adapted to interengage with corresponding spline teeth 58 on each section of the shaft 12, so that it is thus possible for the sleeve, when disengaged from one shaft section, to be turned only a small fraction of a revolution and reengaged. This makes it possible to effect either a very fine or a coarser adjustment of the switches relatively to their actuating lever 17, as may be required, and such a minute or coarse adjustment of the switches can be made quickly and easily, simply by slipping the coupling sleeve lengthwise of the shaft, turning it the desired amount, and permitting the spring to return it to its normal coupling position. It will be thus apparent that by means of the adjusting coupling sleeve 55 and the adjusting screw 27, the mechanism can be very quickly and easily adjusted and set to operate at one or another desired range of temperatures, and with greater or less sensitiveness in any range of temperatures for which the device may be set.

As hereinbefore explained, the two switches 20 and 21 are normally held open, or with their contacts out of engagement and their spring arms 25 held under tension in the open position. This prevents possible fluttering or small opening and closing movements of the switches, which might be caused by vibration of the machine or apparatus on which the mechanism is installed and which might result in objectionable rapid small changes in temperature, due to short, rapid actions of the control element.

It will be understood that various changes in the materials, details, and arrangements of parts which have been herein described and illustrated in order to explain the nature of the invention may be made by those skilled in the art within the principle and scope of the invention as expressed in the appended claims.

I claim as my invention:

1. In a control apparatus including a control element, and a reversible motor which by forward and reverse operations produces different actions of said control element, the improved construction comprising two spring closed electrical switches and connections which by closing said respective switches cause forward and reverse operation of said motor, a switch actuating member which normally holds said switches open against the closing action of their springs, thermo-responsive means which act upon a rise in temperature to actuate said member to close one of said switches and start said motor and which act upon a fall in temperature to actuate said member to close said second switch and cause reverse operation of the motor, and means driven by said motor which shift said switches relatively to said actuating member for opening each switch to stop the motor after said switch has been closed by said actuating member.

2. In a control apparatus including a control element, and a reversible motor which by forward and reverse operations produces different actions of said control element, the improved construction comprising two spring-closed but normally open electrical switches and connections which by the closing of said respective switches cause forward and reverse operation of said motor, a switch actuating member movement of which is resisted by the springs of said switches, thermoresponsive means which act upon a rise in temperature to actuate said member to close one of said switches and start said motor and which act upon a fall in temperature to actuate said member to close said second switch and cause reverse operation of the motor, and means driven by said motor which moves the closed switch relatively to said actuating member in the same direction that the actuating member moves for opening said switch to stop the motor after a required movement of the switch by the motor.

3. In a control apparatus including a reversible motor which by forward and reverse operations effects opposite actions of a control element, and two electrical switches and connections one for causing forward operation and the other reverse operation of said motor, the improved construction comprising a switch actuating member which normally holds said switches open against opposing force tending to close said switches, thermoresponsive means which act upon a rise in temperature to actuate said member to retain one of said switches open against the action of said closing force and to close said other switch to start said motor and which act upon a fall in temperature to actuate said member to retain said second switch open against the action of said closing force and to close said first switch to cause reverse operation of the motor, and means driven by said motor which shifts said switches bodily relatively to said actuating member for opening each switch to stop the motor after said switch has been closed by said actuating member.

4. In a control apparatus including a reversible electric motor which by forward and reverse operations effects opposite actions of a control element, the combination of two normally open switches and connections one for causing forward operation and the other reverse operation of said motor, a switch actuating member, thermoresponsive means which act upon a rise in temperature to actuate said member to close one of said switches and start said motor and which act upon a fall in temperature to actuate said member to close said second switch and cause reverse operation of the motor, and means driven by said motor which shifts said switches bodily relatively to said actuating member for opening each switch to stop the motor after said switch has been closed by said actuating member, said drive means for shifting said switches including a coupling device for changing the relation of the parts of said drive means coupled thereby for changing the setting of the switches relatively to said actuating member so as to operate at different temperature ranges.

5. An operating mechanism for a motor operated control element, comprising two electrical switches and connections which by closing of said respective switches cause forward and reverse operation of said motor and element, said switches having spring means for closing them an actuating member positioned between said switches and arranged to hold said switches normally open against the closing action of their springs, means which act responsive to a rise in temperature to move said member in one direction to close one of said switches and start said motor and act in response to a fall in temperature to move said member in the opposite direction to close said second switch and cause reverse operation of said motor, and means driven by said motor which shifts said switches bodily in the direction in which said actuating member is moved in closing each switch for opening said switch to stop the motor after said switch has been closed by said actuating member.

6. A switch mechanism for a purpose such as described, comprising two movably mounted switches, an actuating member positioned between said switches and arranged to hold said switches normally open against spring action tending to close the switches, means which act under one condition to move said member in one direction in opposition to said spring action to close one of said switches and retain the second switch open, and which act under another condition to move said member in the opposite direction to close said second switch and retain the first switch open, and drive means set in motion by closing either of said switches which shifts said switches bodily in the direction in which said actuating member is moved in closing said switch for opening said switch after it has been closed by said actuating member.

7. A switch mechanism for a purpose such as described, comprising a switch, a movable actuating member for said switch, means which move said member for actuating said switch, and drive means which are set in motion by said actuation of the switch and effect a change in the positional relationship between said switch and its said actuating member for producing a reverse operation of the switch, said drive means including aligned rotary shaft sections, and a coupling sleeve for said shaft sections having splined engagements therewith, said sleeve being movable axially on one shaft section to disengage the other section and uncouple the sections and being reengageable with the other section in different radially adjusted relations thereto.

8. A switch mechanism according to claim 7, in which a spring normally holds said coupling sleeve in coupling position, and acts to reengage the sleeve with a shaft section when the sleeve is released after having been moved to uncouple the sections for relative adjustment thereof.

9. In a control apparatus comprising a reversible motor, a control element actuated thereby, two electrical switches and connections which by closing said respective switches produce opposite operations of said motor and control element, and a thermoresponsive actuating member which upon a rise in temperature effects the closing of one switch and upon a fall in temperature effects the closing of the other switch, the improved construction which comprises means that normally bias said switches toward their closed positions and in which said actuating member normally retains the switches open in opposition to said closing bias, and means driven by said motor which shifts the positions of said switches relatively to said actuating member for opening either switch to stop the motor after said actuating member has closed said switch and started the motor.

10. An operating mechanism for a reversible control motor, comprising two electrical switches and connections which by closing said respective switches cause opposite operations of said motor, each of said switches comprising two members one of which is spring actuated toward the other for closing the switch, a switch-actuating member arranged to normally hold the spring-actuated members of said switches against closing movement, power-operated means which act responsive to a certain condition to move said switch-actuating member in one direction to retain one of said switches open and cause the second switch to close and operate said motor, and which power-operated means acts responsive to a different condition to move said switch-actuating member in a different direction to retain said second switch open and cause the first switch to close and reverse the operation of said motor, and means driven by said motor which shifts said switches bodily in the direction in which said actuating member is moved when closing either switch for opening said switch after said switch has been closed.

11. An operating mechanism for a motor operated control element, comprising two electrical switches and connections which by closing of said respective switches cause forward and reverse operation of said motor and element, said switches having spring means for closing them, an actuating member positioned between said switches and arranged to hold said switches normally open against the closing action of their springs, means which act responsive to a rise in temperature to move said member in one direction to close one of said switches and start said motor and act in response to a fall in temperature to move said member in the opposite direction to close said second switch and cause reverse operation of said motor, and means driven by said motor which shifts said switches bodily in the direction in which said actuating member is moved in closing each switch for opening said switch to stop the motor after said switch has been closed by said actuating member, said drive means including a device for changing the relation between cooperating parts of said drive means for setting said mechanism to operate at different temperature ranges.

12. An operating mechanism for a motor operated control element, comprising two electrical switches and connections which by closing of said respective switches cause forward and reverse operation of said motor and element, said switches having spring means for closing them, an actuating member positioned between said switches and arranged to hold said switches normally open against the closing action of their springs, means which act responsive to a rise in temperature to move said member in one direction to close one of said switches and start said motor and act in response to a fall in temperature to move said member in the opposite direction to close said second switch and cause reverse operation of said motor, means driven by said motor which shifts said switches bodily in the direction in which said actuating member is moved in closing each switch for opening said switch to stop the motor after said switch has been closed by said actuating member, and means for simultaneously and correspondingly adjusting said switches nearer to or farther from said actuating member.

13. An operating mechanism for a motor operated control element, comprising two electrical switches and connections which by closing of said respective switches cause forward and reverse operation of said motor and element, said switches having spring means for closing them, an actuating member positioned between said switches and arranged to hold said switches normally open against the closing action of their springs, means which act responsive to a rise in temperature to move said member in one direction to close one of said switches and start said motor and act in response to a fall in temperature to move said member in the opposite direction to close said second switch and cause reverse operation of said motor, means driven by said motor which shifts said switches bodily in the direction in which said actuating member is moved in closing each switch for opening said switch to stop the motor after said switch has been closed by said actuating member, and means for simultaneously and correspondingly adjusting said switches nearer to or farther from said actuating member, said drive means including a device for changing the relation between cooperating parts of said drive means for setting said mechanism to operate at different temperature ranges.

14. A switch mechanism for a purpose such as described, comprising two movably mounted switches, an actuating member positioned between said switches and arranged to hold said switches normally open against spring action tending to close the switches, means which act under one condition to move said member in one direction in opposition to said spring action to close one of said switches and retain the second switch open, and which act under another condition to move said member in the opposite direction to close said second switch and retain the first switch open, drive means set in motion by closing either of said switches which shifts said switches bodily in the direction in which said actuating member is moved in closing said switch for opening said switch after it has been closed by said actuating member, and means for adjusting said switches bodily nearer to or farther from said actuating member.

15. A switch mechanism for a purpose such as described, comprising two movably mounted switches, an actuating member positioned between said switches and arranged to hold said switches normally open against spring action tending to close the switches, means which act under one condition to move said member in one direction in opposition to said spring action to close one of said switches and retain the second switch open, and which act under another condition to move said member in the opposite direction to close said second switch and retain the first switch open, drive means set in motion by closing either of said switches which shifts said switches bodily in the direction in which said actuating member is moved in closing said switch for opening said switch after it has been closed by said actuating member, and means for effecting a variable different relative position between each of said switches and said actuating member for setting said mechanism to operate at different condition ranges.

16. An operating mechanism for a motor operated control element comprising two electrical switches and connections which by actuation of said respective switches cause forward and reverse operation of said motor and element, a switch actuating member arranged to normally hold said switches from such actuation, means constructed to act automatically responsive to one condition to move said actuating member to actuate one of said switches and start said motor and to act responsive to another condition to effect a different movement of said actuating member to actuate said second switch and cause reverse operation of said motor, and drive means which is driven by said motor and shifts said switches bodily relatively to said actuating member for actuating each switch to stop the motor after actuation of said switch by said member to start the motor, said drive means including a device for changing the relation between cooperating parts of said drive means for setting said mechanism to operate at different condition ranges.

17. An operating mechanism for a motor operated control element comprising two electrical switches and connections which by actuation of said respective switches cause forward and reverse operation of said motor and element, a switch actuating member arranged to normally hold said switches from such actuation, means constructed to act automatically responsive to one condition to move said actuating member to actuate one of said switches and start said motor and to act responsive to another condition to effect a different movement of said actuating member to actuate said second switch and cause reverse operation of said motor, drive means which is driven by said motor and shifts said switches bodily relatively to said actuating member for actuating each switch to stop the motor after actuation of said switch by said member to start the motor, and means for simultaneously and correspondingly adjusting said switches nearer to or farther from said actuating member.

18. An operating mechanism for a motor operated control element comprising two electrical switches and connections which by actuation of said respective switches cause forward and reverse operation of said motor and element, a switch actuating member arranged to normally hold said switches from such actuation, means constructed to act automatically responsive to one condition to move said actuating member to actuate one of said switches and start said motor and to act responsive to another condition to effect a different movement of said actuating member to actuate said second switch and cause reverse operation of said motor, and drive means which is driven by said motor and shifts said switches bodily relatively to said actuating member for actuating each switch to stop the motor after actuation of said switch by said member to start the motor, said drive means including a device for changing the relation between cooperating parts of said drive means for setting said mechanism to operate at different condition ranges, and means for simultaneously and correspondingly adjusting said switches nearer to or farther from said actuating member.

FREDERICK G. CLARK.